United States Patent
Besling et al.

(10) Patent No.: US 9,383,282 B2
(45) Date of Patent: Jul. 5, 2016

(54) MEMS CAPACITIVE PRESSURE SENSOR, OPERATING METHOD AND MANUFACTURING METHOD

(75) Inventors: Willem Frederik Adrianus Besling, Eindhoven (NL); Klaus Reimann, Eindhoven (NL); Peter Steeneken, Valkenswaard (NL); Olaf Wunnicke, Eindhoven (NL); Reinout Woltjer, Eindhoven (NL)

(73) Assignee: AMS INTERNATIONAL AG, Rapperswil-Jona (CH)

(*) Notice: Subject to any disclaimer, the term of this patent is extended or adjusted under 35 U.S.C. 154(b) by 483 days.

(21) Appl. No.: 13/462,582

(22) Filed: May 2, 2012

(65) Prior Publication Data
US 2013/0118265 A1    May 16, 2013

(30) Foreign Application Priority Data
May 4, 2011  (EP) ................................. 11164756

(51) Int. Cl.
*G01L 9/00*   (2006.01)
*G01L 9/12*   (2006.01)
*G01L 19/00*  (2006.01)
*G01L 27/00*  (2006.01)

(52) U.S. Cl.
CPC ............ *G01L 9/0005* (2013.01); *G01L 9/0042* (2013.01); *G01L 9/0073* (2013.01); *G01L 9/125* (2013.01); *G01L 19/0076* (2013.01); *G01L 27/002* (2013.01)

(58) Field of Classification Search
CPC ....... G01L 9/0042; G01L 9/0073; G01L 9/12; G01L 9/0005; G01L 19/0076; G01L 27/002; G01L 9/125

USPC ............................................... 73/724; 216/13
See application file for complete search history.

(56) References Cited

U.S. PATENT DOCUMENTS

| 4,289,035 | A  | 9/1981 | Lee |
| 4,542,436 | A  | 9/1985 | Carusillo |
| 6,236,096 | B1 | 5/2001 | Chang et al. |
| 6,424,036 | B1 | 7/2002 | Okada |

(Continued)

FOREIGN PATENT DOCUMENTS

| CN | 102275865   | 4/2006 |
| CN | 1953166 A   | 4/2007 |

(Continued)

OTHER PUBLICATIONS

Office Action from counterpart application CN 2012/10135456.X (Feb. 8, 2014).

(Continued)

*Primary Examiner* — Lisa Caputo
*Assistant Examiner* — Philip Cotey
(74) *Attorney, Agent, or Firm* — McDermott Will & Emery LLP (57) ABSTRACT

A MEMS pressure sensor wherein at least one of the electrode arrangements comprises an inner electrode and an outer electrode arranged around the inner electrode. The capacitances associated with the inner electrode and the outer electrode are independently measured and can be differentially measured. This arrangement enables various different read out schemes to be implemented and also enables improved compensation for variations between devices or changes in device characteristics over time.

19 Claims, 9 Drawing Sheets

(56) References Cited

U.S. PATENT DOCUMENTS

| | | | |
|---|---|---|---|
| 7,216,048 B2 | 5/2007 | Wang et al. | |
| 7,611,964 B2 | 11/2009 | Cho et al. | |
| 7,906,398 B2 | 3/2011 | Park et al. | |
| 7,952,206 B2 | 5/2011 | Bachman et al. | |
| 2002/0011114 A1 | 1/2002 | Miyashita et al. | |
| 2003/0015040 A1 | 1/2003 | Ishio et al. | |
| 2004/0182165 A1 | 9/2004 | Miyashita | |
| 2004/0219706 A1* | 11/2004 | Wan | 438/53 |
| 2005/0017313 A1* | 1/2005 | Wan | 257/415 |
| 2005/0279174 A1 | 12/2005 | Park et al. | |
| 2007/0068266 A1 | 3/2007 | Fujimori et al. | |
| 2007/0107524 A1 | 5/2007 | O'Brien et al. | |
| 2007/0169557 A1 | 7/2007 | Harasyn et al. | |
| 2010/0050776 A1 | 3/2010 | Fuhrmann et al. | |
| 2010/0192694 A1 | 8/2010 | Hammerschmidt | |
| 2012/0133005 A1* | 5/2012 | Langeries | B06B 1/0292 257/416 |

FOREIGN PATENT DOCUMENTS

| | | |
|---|---|---|
| CN | 10113309 A | 2/2008 |
| CN | 101471305 A | 7/2009 |
| CN | 101552239 A | 10/2009 |
| CN | 101577251 A | 11/2009 |
| CN | 1250951 C | 12/2011 |
| EP | 2 269 746 A1 | 1/2011 |
| WO | 2008/149298 A1 | 12/2008 |
| WO | 2011/015302 A1 | 2/2011 |

OTHER PUBLICATIONS

Office Action from counterpart application CN 201210135456.X (Aug. 5, 2014).

De Bruyker, D. et al. "A Combined Piezoresistive/ Capacitive Pressure Sensor with Self-Test Function Based on Thermal Actuation", Sensors & Actuators A66, pp. 70-75 (1998).

Extended European Search Report for European Patent Appln. No. 12165684.7 (Dec. 5, 2012).

Chavan, A. et al. "Batch-Processed Vacuum-Sealed Capacitive Pressure Sensors", J. of Microelectromechanical Systems, vol. 10, No. 4, pp. 580-588 (Dec. 2001).

Caliano, G. et al. "Micromachined Ultrasonic Transducers Using Silicon Nitride Membrane Fabricated in PECVD Technology", 2000 IEEE Ultrasonics Symposium, vol. 1, pp. 963-968 (Oct. 2000).

Shavezipur, M. "Novel MEMS Tunable Capacitors with Linear Capacitanee-Voltage Response Considering Fabrication Uncertainties", Thesis, Univ. of Waterloo, Dept. of Mech. Eng. (2008).

Guldiken, R.O. et al. "CMUTS with Dual-Electrode Structure for Improved Transmit and Receive Performance", IEEE Trans. on Ultrasonics, Ferroelectrics and Frequency Control, vol. 53, No. 2, pp. 483-491 (Feb. 2006).

Machida, S. "MEMS Technology Using Back-End of Line Processes in CMOS LSI", IEEE Int'l. Interconnect Technology Conference (IITC), 3 pgs. (Jun. 2010).

Extended European Search Report for European Patent Appln. No. 11164756.6 (Oct. 19, 2011).

* cited by examiner

MEMS CAPACITIVE PRESSURE SENSOR, OPERATING METHOD AND MANUFACTURING METHOD

This application claims the priority under 35 U.S.C. §119 of European patent application no. 11164756.6, filed on May 4, 2011, the contents of which are incorporated by reference herein.

FIELD OF THE INVENTION

This invention relates to MEMS capacitive pressure sensors.

BACKGROUND OF THE INVENTION

MEMS pressure sensors are well known, and typically have a piezo-resistive or a capacitive read-out, to detect movement of a suspended structure when it is subjected to an external pressure. One example of known device uses a thin circular suspended SiN membrane, which is used within a capacitive MEMS pressure gauge.

The cavity underneath the SiN membrane is hermitically closed by means of a PECVD SiN process, for example using a 2 μm thick PECVD SiN film. The final device performance is largely determined by the physical, mechanical and structural properties of this film and the thickness necessary to close the sacrificial etch holes. The density and composition of this membrane determine the hermeticity, out-gassing behaviour, and internal stress. The stress together with the thickness determine the membrane rigidity and hence the sensitivity of the pressure sensor.

Critical systems in medical applications, alternative energy applications, smart buildings, engine control (e.g. gas and fuel inlet pressure), and automotive safety applications such as tyre monitoring systems, require pressure sensors that deliver accurate and predictable output over their lifetime in order to track changes in operation before those changes become critical. MEMS pressure sensors are now widely used in such applications.

With increasing miniaturization, MEMS pressure sensors also start to suffer performance issues. For instance, issues arise relating to insensitivity, inaccuracy and signal drift. Although state-of-the-art deposition tools and lithographic techniques are being employed, it is impossible to ensure that all MEMS devices are uniformly deposited or have identical geometries. Since no two MEMS devices are exactly the same, there has to be some means of calibrating them to cancel out those irregularities. As it is highly impractical to measure individual device parameters in an industrial fabrication environment (for example deflection profiles in relation to an externally applied force), it is important to develop methods for internal calibration to ensure that two MEMS devices function or measure in exactly the same way.

Self-calibration also is needed because the devices can be exposed to harsh environments or remain dormant for long periods. In some cases the device should wake up and recalibrate itself to account for changes resulting from temperature differences, changes in the gas or liquid ambient surroundings, or other conditions that might affect the properties.

Currently most MEMS pressure sensors use a hermetically sealed membrane that seals a reference cavity which is at a certain gauge pressure (in some cases the gauge pressure is a vacuum). The external pressure is measured because the pressure difference between the external pressure and the gauge pressure generates a force on the membrane, which causes the membrane to deflect. This deflection is then measured by piezoresistive, capacitive or optical sensors. There are several difficulties related to this conventional pressure sensor design.

For example, the gas pressure in the reference cavity needs to be very stable in order to avoid signal drift. This requires a very high level of hermeticity without out-gassing of the membrane.

However, in order to have a large deflection and optimum sensitivity, the thickness of the membrane should be thin (or it should have a large area). Since it is difficult to make very thin membranes hermetic, these are conflicting requirements and lead to a larger sensor size.

If the reference cavity is at a certain pressure, this pressure will be temperature dependent (according to Boyle's law). The sensor thus becomes temperature dependent. The sensitivity of the pressure sensor is determined by the amplitude of membrane deformation which is in turn defined by the thickness, diameter, and yield strength of the membrane. For a sensor with capacitive read-out, the sensitivity depends also on the distance of the plates becoming larger for higher pressures. The total dynamic range of deflection-based pressure sensors is also limited by the maximum deflection of the membrane.

It is clear therefore that any variation in membrane thickness, diameter, and stress has a significant impact on the resulting deflection profile of the membrane which affects not only the absolute capacitance reading but also accuracy and precision of the read-out. Due to process variations during fabrication, no two microstructures have the same geometric and material properties which will induce small variations in dimension, mass, stiffness that will significantly affect performance. For instance, a 10% variation in membrane thickness can cause a 50%-100% change in a microstructure's stiffness and pressure sensitivity if the membrane contains compressive and tensile layers. The actual dependence depends on the way the membrane is arranged to deflect. For instance, the thickness dependence for stress dominated membranes is proportional to the thickness whereas for bending stiffness dominated membranes it is proportional to thickness to the power of 3.

SUMMARY OF THE INVENTION

According to the invention, there is provided a MEMS pressure sensor comprising opposing electrode arrangements, wherein one of the electrode arrangements is suspended over the other such that it is movable in response to an applied pressure, and means for deriving an output from a capacitance between the electrode arrangements, wherein at least one of the electrode arrangements comprises an inner electrode and an outer electrode arranged around the inner electrode, and wherein the means for deriving an output is configurable to measure independently the capacitance associated with the inner electrode and the outer electrode.

A cavity is preferably defined between the electrode arrangements, and this can be a vacuum sealed cavity.

The use of one (or both) electrode arrangements as a segmented electrode enables a number of different modes of operation to be implemented.

For example, a differential capacitance read-out can be used. This differential capacitance measurement can be used in order to determine the deflection state of the pressure sensor (such as whether touch down has occurred, or to detect that the sensor is in a non-deflected state) independently from the absolute capacitance that is being measured. Variations in process conditions for example due to non-uniform membrane thickness will lead to a large spread in the deflection profiles and can thus be individually determined and calibrated for in circuit design.

In one example, the inner electrode is circular and the outer electrode is annular, and they have the same area. The inner circular electrode gives the largest deflection for a certain pressure variation and is hence ideally suited to improve sensitivity when used as the read out electrode. The matched areas mean that maximum sensitivity is obtained, wherein the capacitance change per surface area is maximal within a certain pressure range (the deflection amplitude and electrode distance determine sensitivity). For circular electrodes, this area matching occurs if the inner electrode radius is 7/10th and the outer electrode is 3/10th of the total radius of the membrane.

Means can be provided for applying a voltage bias to the inner or outer electrode, and the other electrode can then be used for capacitance measurement. One of the electrodes can be kept at a constant voltage creating an attractive force to correct for device variations, or small drifts in sensor performance or to boost the sensitivity.

In one example, a voltage bias is applied to the inner or outer electrode, and a feedback system is provided for maintaining a fixed ratio between the capacitance associated with the inner electrode and the outer electrode such as to maintain the suspended electrode arrangement in a flat configuration. This fixed ratio is 1 if the areas are the same but any ratio can be chosen depending on the required sensitivity. The voltage bias needed to maintain the suspended electrode flat can then be used to derive the pressure output of the sensor.

The means for deriving an output can be configurable to enable the output to be derived from any of:
the capacitance associated with the inner electrode alone;
the capacitance associated with the outer electrode alone;
the combined capacitances associated with the inner and outer electrodes.

This means that the capacitance used for read out can be selected for optimum sensitivity, best linearity, best signal to noise ratio, or best dynamic range (for example).

The invention also provides a method of operating a MEMS pressure sensor, wherein the pressure sensor comprises opposing electrode arrangements, wherein one of the electrode arrangements is suspended over the other such that it is movable in response to an applied pressure, wherein at least one of the electrode arrangements comprises an inner electrode and an outer electrode arranged around the inner electrode, wherein the method comprises measuring independently the capacitance associated with the inner electrode and the outer electrode to derive an output signal representing the pressure.

The method can comprise deriving a differential capacitance between the capacitances associated with the inner and outer electrodes and using the differential capacitance to determine when the movable electrode arrangement has reached its limit of movement. Which electrode to be used for deriving the output can then be based on whether the limit of movement has been reached.

Other implementations of the method include:
applying a voltage bias to the inner and/or outer electrode, and measuring simultaneously the capacitance change and using this information for determining the state of membrane deflection and/or mechanical compliance of the membrane and storing the measurement data in a memory for calibration purposes; or applying a voltage bias to the inner and/or outer electrode, and determining the resonance frequency and quality factor of an electrostatic excited membrane and using this information for determining the state of membrane deflection and/or mechanical compliance of the membrane and storing the measurement data in a memory for calibration purposes; or applying a voltage bias to the inner and/or outer electrode, to tune the pressure sensitivity to a desired range.

The invention also provides a method of fabricating a MEMS pressure sensor, comprising:
forming opposing electrode arrangements over a substrate, with one of the electrode arrangements is fixed to the substrate and the other is suspended over the top such that it is movable in response to an applied pressure,
wherein forming at least one of the electrode arrangements comprises forming an inner electrode and an outer electrode arranged around the inner electrode, and forming separate read out terminals for the inner and outer electrodes.

In one detailed example, the method comprises:
forming a lower metal layer over a substrate arrangement and defining the one electrode arrangement;
forming a sacrificial layer over the lower metal layer to define the cavity;
forming a passivation layer over the sacrificial layer;
forming a top metal layer and defining the other electrode arrangement, wherein the passivation layer avoids electrical contact between the lower metal layer and the top metal layer;
forming a capping layer over the top metal layer;
forming an etch opening in the capping layer leading to the sacrificial layer;
removing the sacrificial layer through the etch opening;
forming a plugging layer for plugging the etch opening; and
removing the plugging layer other than over the etch opening.

The etch opening can be formed laterally to the side of the electrode arrangements, and the plugging layer can be a metal formed by PVD.

BRIEF DESCRIPTION OF DRAWINGS

Examples of the invention will now be described with reference to the accompanying drawings, in which.

DETAILED DESCRIPTION OF EMBODIMENTS

The invention provides a MEMS pressure sensor wherein at least one of the electrode arrangements comprises an inner electrode and an outer electrode arranged around the inner electrode. The capacitances associated with the inner electrode and the outer electrode are independently measured and can be differentially measured. This arrangement enables various different read out schemes to be implemented and also enables improved compensation for variations between devices or changes in device characteristics over time.

The invention makes use of different electrode areas. To understand the significance of different electrode areas at the centre and edge of the movable electrode arrangement, a geometrical analysis is useful.

Figure 1:
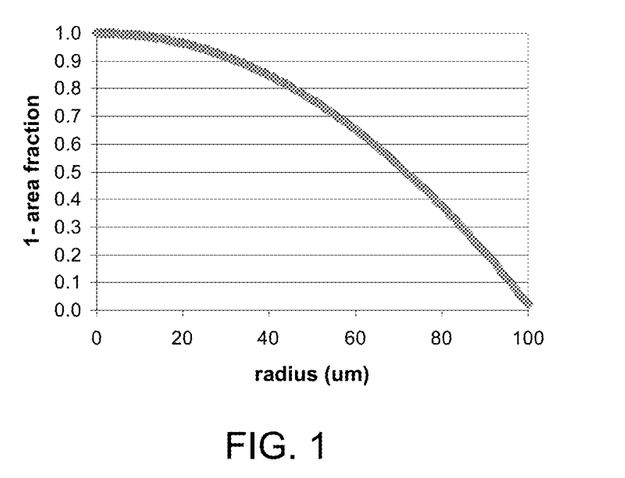
FIG. 1 shows the fraction of the area of a circular surface as a function of its radius.

FIG. 1 shows the fraction of the area of a circular surface as a function of its radius. For example, FIG. 1 shows that the surface area of a donut-like ring with an inner radius of 90 um extending to an outer radius of 100 μm covers about 20% of the total surface compared to the surface of a complete circle with 100 μm radius. A solid circle covering the same surface area of 20% has a diameter of 45 μm. In order to obtain an equal surface area of an inner circle and an outer ring, the radius of the circle must be around 70 μm (more exactly 100/sqrt2) whereas the outer ring extends from 70 μm to 100 μm.

Figure 2:
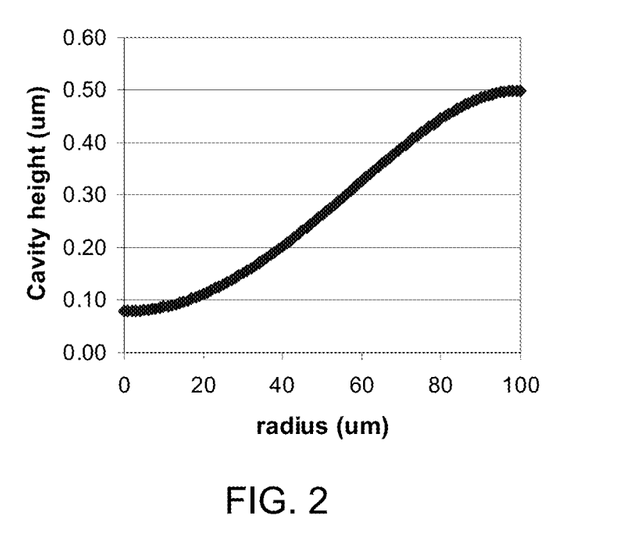
FIG. 2 shows the deflection (expressed as the cavity height) of a membrane at different points of the membrane.

In FIG. 2 the deflection (expressed as the cavity height) of a SiN membrane at different points of the membrane is shown at an externally applied uniform pressure of 100 kPa. The membrane is chosen to be 3 μm thick to make it sufficiently rigid. Nevertheless, the membrane is pushed almost to collapse (because the cavity height almost reaches zero in the centre, where radius=0) due to the pressure difference.

Figure 3:
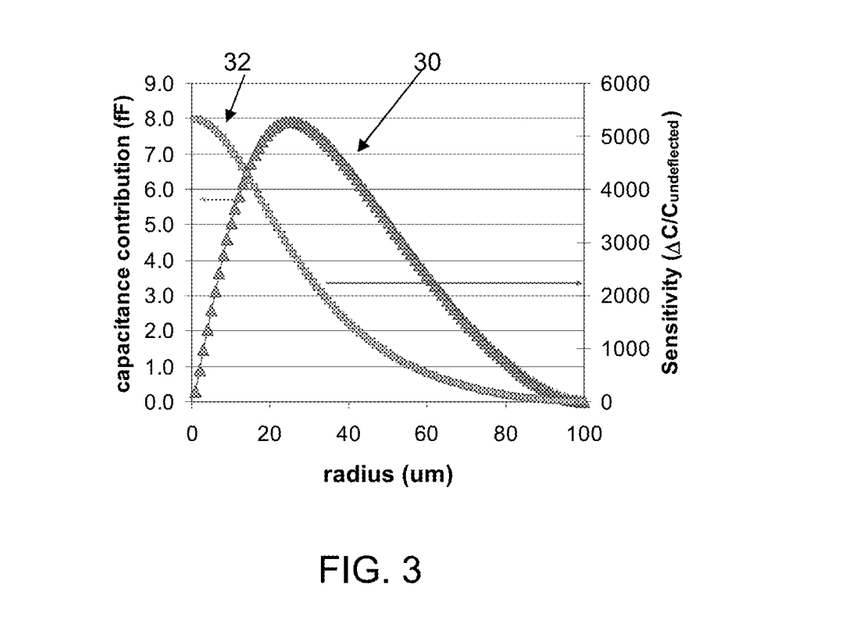
FIG. 3 shows the capacitance as function of radius.

The capacitance as function of radius is shown in FIG. 3 as plot 30, and it can be seen that the contribution to the total capacitance is low in the center of the membrane (because of the small area) although the capacitance per unit area is high due to the relatively small distance between the electrodes. FIG. 3 shows the capacitance contribution per ring of 1 μm to the total capacitance for a 1 bar pressure difference. The contribution to the total capacitance increases quadratically with radius but gradually levels off due to the increasing distance between the plates. Depending on the deflection of the plate and the gap distance a maximum contribution is obtained at a distance between 20 μm and 50 μm from the center of the membrane.

Although the sensitivity of the membrane (plot 32) is the largest in the center of the membrane, the contribution to the total capacitance will be relatively small. The sensitivity is calculated as the capacitance difference between a deflected, 200 μm diameter SiN membrane (3 μm thick, 500 nm gap, Young's modulus 140 GPa, at 1 bar external pressure and zero cavity pressure) and a rigid plate (the same membrane at 0 bar external pressure).

Although it can be argued that it is beneficial to use the full membrane area to make the capacitance difference as large as possible, the relative increase will become very small at the edge of the membrane where the deflection will become zero. At the edge, the total capacitance increases quadratically with increasing distance from the edge without adding much to the capacitance difference due to the insignificant deflection of the membrane. This effect will have a significant impact on the signal-to-noise behaviour. For large capacitance values it will become more and more difficult to detect and filter-out small capacitance variations. Due to the fact that the membrane is not deflecting much near its edge, the ratio of the electrode diameter to membrane diameter can be optimized for maximum signal to noise ratio.

If the capacitance is read-out with an AC current, the signal is proportional to $\Delta I = \omega \cdot \Delta C \cdot U$ with carrier $I = \omega \cdot C \cdot U$, $\omega$ the charge-discharge frequency and U the applied voltage. The shot noise is proportional to $sqrt(2q \cdot I \cdot \Delta f)$ where q is the elementary charge and $\Delta f$ is the bandwidth.

Figure 4:
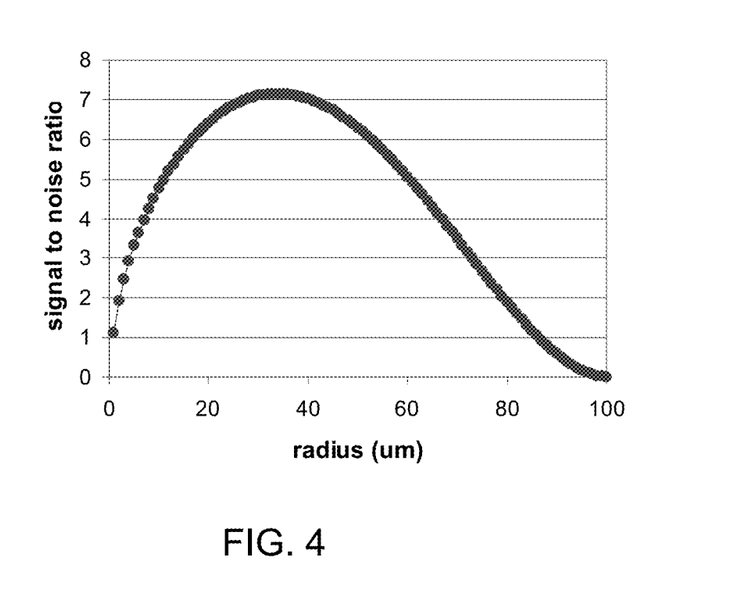
FIG. 4 shows the signal-to-noise ratio as a function of radius.

The signal-to-noise ratio S/N is proportional to $\Delta C/sqrt(C)$. In FIG. 4 the signal-to-noise ratio is plotted as a function of radius for a pressure change of 100 Pa at 1 bar absolute pressure, 100 Hz bandwidth and a charge-discharge frequency of 10 kHz.

The peak in the S/N value will shift to a larger radius at smaller pressures but the absolute value becomes much smaller due to a smaller deflection of the membrane. If it is assumed that the read-out electronics is not able to discern a signal (i.e. a capacitance change) from the electron shot noise with a S/N smaller than 2 then the outer 20 μm of the electrode can be removed without causing S/N problems.

A first use of the segmented electrode of the invention is to use an electrode with a smaller surface area than the membrane, in order to detect small pressure fluctuations. For large pressure changes the full membrane area can be used in order to capture as much as signal as possible. If a dual electrode configuration is used, there is the ability to select either the inner electrode for maximum signal to noise or both electrodes if the dynamic pressure range is large enough.

Several options for electrode configurations are given below.

Figure 5:
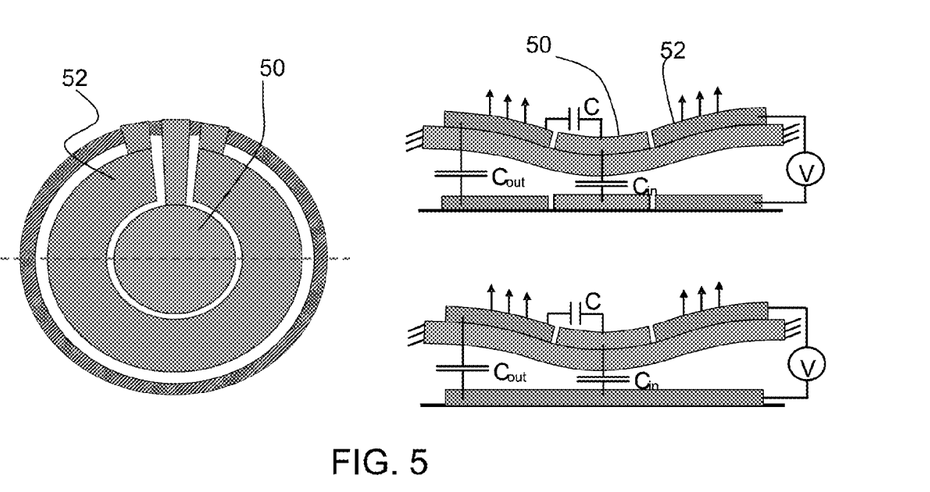
FIG. 5 shows two examples of dual electrode design of the invention.

The most simple design, with a dual top electrode is shown in FIG. 5. The top electrode layer has an inner circular electrode 50 and an annular outer electrode 52. The opposing bottom electrode can be continuous or segmented (to match the top electrodes) as shown in the two cross sections in FIG. 5, which give alternative examples.

The segmentation can also be created in the bottom electrode layer alone (not shown). The outer electrode can be used as a shield when only the inner electrode is being used for measurement. The direct capacitance between the two active electrodes is the capacitance of interest, and, when shielded leads are used, it is independent of the location of all other conductors except the shield.

When the outer electrode is used as shield, the influence of circuitry/signals around the sensor can be shielded from the two active electrodes that are opposite to each other. Although the shield will have a parasitic capacitance to the sensing electrode(s) this capacitance will be constant and known.

Although a dual electrode gives the largest capacitance per electrode, multi-segmented designs can be applied that can be used to optimize sensitivity in a very specific pressure range upon selecting the electrode of interest i.e. the one that shows the largest deflection in a certain pressure range.

Figure 6:
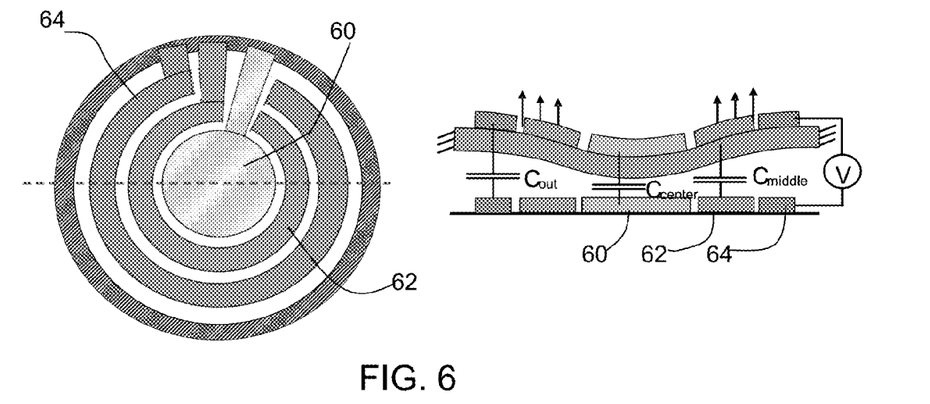
FIG. 6 shows a three electrode design of the invention.

FIG. 6 shows a central circular electrode 60 and two concentric outer electrodes 62, 64, and shows in cross section the example with the segmentation of the top and bottom electrodes. The segmentation does not need to be the same on the top and bottom electrodes, and the top or bottom or both electrodes can be segmented.

Various capacitance measurement methods exist, which can be used to measure the multiple capacitances produced by the sensor, namely the capacitances Gout (capacitance associated with the outer electrode), Cin or Ccenter (capacitance associated with the central electrode) and Cmiddle (capacitance associated with the middle of the three concentric electrodes in FIG. 6), Most capacitance measurements involve simply a comparison of the capacitor to be measured with a capacitor of known value. This method can be applied to measure to capacitance ratio and for example find the zero deflection point of the membrane if identical electrode surfaces are being used (this is discussed further below). Such comparison can be performed frequently if one of the capacitors is substituted for the other at the same point in an electrical circuit.

Bridge comparison methods are very well suited to compare capacitors with high accuracy. Resistance-ratio bridges are Wheatstone-bridge configurations in which the potential division is measured of a variable capacitor and either a parallel combination of a standard loss-free capacitor Cs and a conductance Gs or a series combination of Cs and a resistor Rs. If these two parameters are equal to the ratio of potentials across two well defined resistors R1 and R2 the detector is nulled.

Time-constant methods rely on the measurement of the time constant of charge or discharge of a capacitor through a known resistor. If a voltage is applied in a step function fashion to a combination of an initially discharged capacitor and a resistor in series, the charge and the voltage on the capacitor increase exponentially toward their full magnitudes with a time constant equal in seconds to the product of the resistance in Ohms and the capacitance in farads. Similarly, when a charged capacitor is discharged through a resistor, the charge and the voltage decay with the same time constant. The time or frequency of such a charge-discharge cycle can easily be determined with standard methods.

Figure 7:
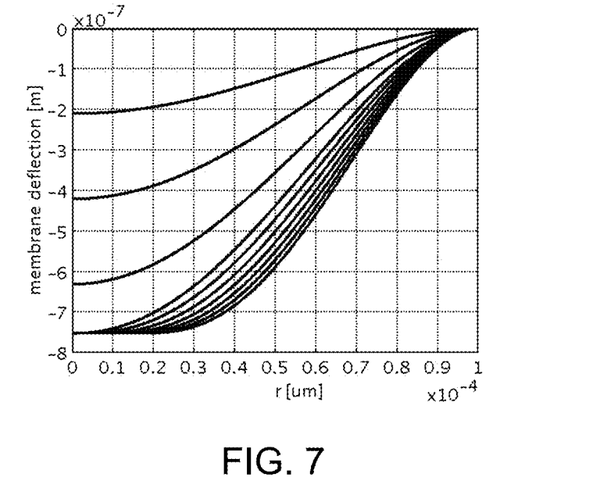
FIG. 7 shows the relation between the deflection of a circular membrane and the radius, for different pressure values.

The diaphragm dimensions can be designed in order to set the pressure range. FIG. 7 shows the relation between the deflection of a circular membrane and the radius, for different pressure values. The deflection of a circular membrane w(r) in the flexural rigidity dominated regime as function of pressure P is given by $$w_D(r, P) = \frac{3P\pi R^4(1-v^2)}{16\pi E h^3}\left[1-\left(\frac{r}{R}\right)^2\right]^2$$

where R is the radius of the membrane and r the distance from the edge to the actual deflection point, v the Poisson ratio, E the Young's modulus and h the membrane thickness. As apparent from the relation above, the deflection scales with $R^4$ and $1/h^3$ showing the impact of small variations in size and or thickness on the defection profile.

In FIG. 7 the membrane deflection is calculated as function of pressure. The membrane deflection with respect to radial position is given for a 200 µm diameter SiN membrane with 1.5 µm thickness. The pressure is increased from 0.1 to 1 bar in 0.1 bar steps. The plot for 0.1 bar is at the top and successive lower plots represent increasing pressure. Membrane collapse (to $-7.5 \times 10^{-7}$ m) occurs at 0.35 bar. The pressure inside the cavity is zero and no residual stress is assumed.

Figure 8:
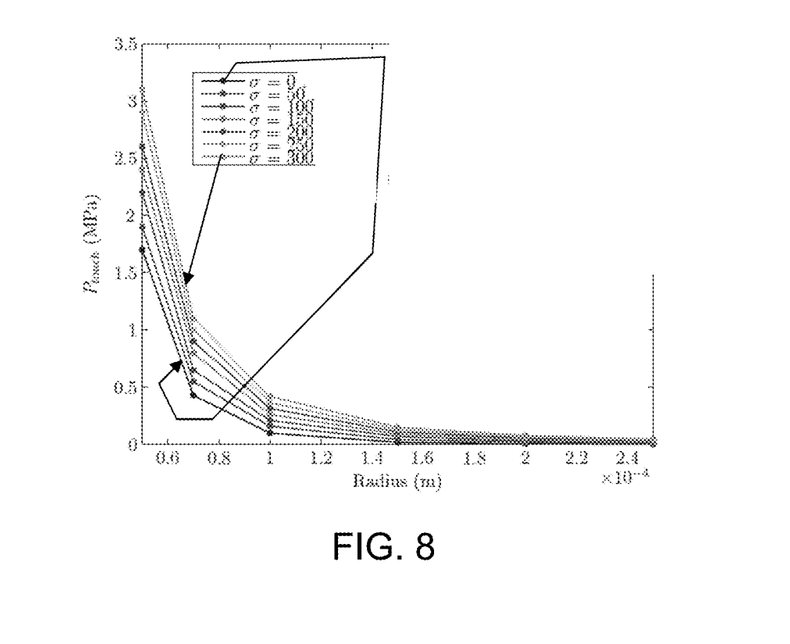
FIG. 8 shows the touch point pressure as function of membrane radius for different internal stress levels.

Thus, at a certain pressure, the top membrane will start to touch the bottom of the cavity. This relation is valid for films without any internal stress. If internal stress is taken into account the membrane becomes stiffer and the pressure to reach the touch point becomes larger. This is shown in FIG. 8, which shows the touch point pressure as function of membrane radius for different internal stress levels (1.8 µm thick SiN membrane with Young's modulus of 140 MPa and gap height of 1.5 µm). As the internal stress increases from 0 to 300 Mpa in steps of 50 Mpa, the touch point pressure increases as shown.

The most convenient way to adjust the pressure range within a consolidated process flow is to adjust the membrane radius and not the membrane thickness, nor gap height, nor to fine tune the internal stress of the membrane. A realistic gap height from manufacturing point of view varies between 300 nm to 1000 nm. Smaller gaps will induce problems with the removal of the sacrificial layer especially if the membrane radius is large (long etch times are required which poses constraints on the selectivity of the etchants).

Large gaps are more costly to manufacture and create additional topography. Moreover, it will take a larger pressure to fully deflect a membrane to its touch point unless a thinner membrane is applied. The thickness of the membrane is typically chosen to be equal or larger than the gap distance to keep the device in the flexural rigidity controlled regime. This is beneficial because this reduces the impact of residual stress due to process variations on the deflection profile.

One purpose of the design of the invention is to increase the dynamic range of the pressure sensor. There are several known ways to improve the dynamic range of a pressure sensor:

A first approach is to use an array of pressure sensors with different membrane size. As the deflection scales with $1/R^4$ only small variations in membrane radius are required to cover a large pressure range, as can be seen from FIG. 8. Although this approach is very convenient every individual membrane will have its own deflection profile and sensitivity which is not well defined.

The invention provides an approach by which the dynamic range is increased by combining the non-linear capacitance to pressure ("C-P") response with the linear C-P response after collapse of the membrane.

Figure 9:
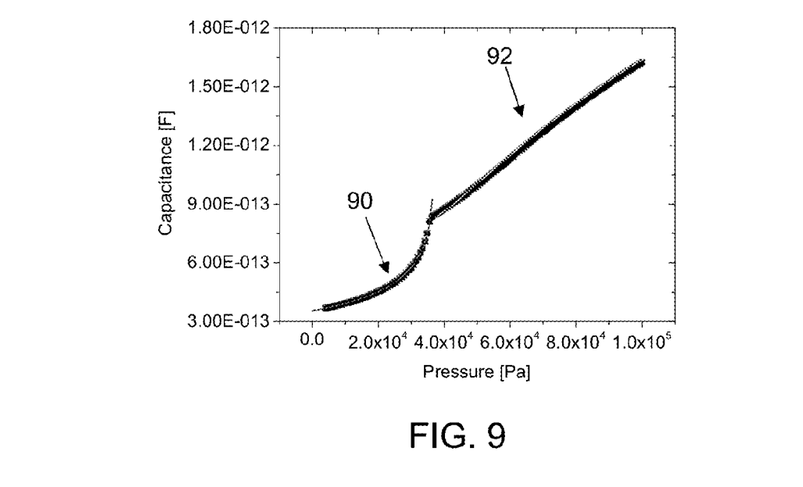
FIG. 9 is a finite element simulation of the capacitance as function of applied pressure, showing transition behaviour between a non-linear and linear response region.

FIG. 9 is a finite element simulation of the capacitance as function of applied pressure, showing this transition behaviour. FIG. 9 shows the capacitance as function of applied external pressure for of a 100 µm radius SiN membrane of 1.5 µm thickness and 750 nm gap (Young's modulus 250 GPa, Poisson ratio 0.23). Between the electrodes is a 200 nm SiN dielectric layer with ∈r=6.

In a conventional pressure sensor, the touch point pressure will vary a lot depending on the initial deflection state of the membrane. It is, therefore, difficult to extend the operation range of the sensor beyond the touch point in a reliable and predictable manner. From FIG. 9, it is apparent that the sensitivity of the device is the largest just before touching the substrate. Due to the decreasing distance between the electrode plates, the capacitance increases non-linearly with pressure up to the point where the top electrode touches the bottom of the cavity—this is part 90 of the plot.

At pressures above the touch point pressure the capacitance shows a linear increase with pressure, as shown in part 92 of the plot.

The use of a segmented electrode allows accurate detection of the touch point pressure and the selection of an optimum electrode and/or electrode configuration to obtain an optimum sensitivity. This can be found in a calibration routine. Moreover, using multiple electrode rings it is possible to detect more accurately the touch point pressure.

Figure 10:
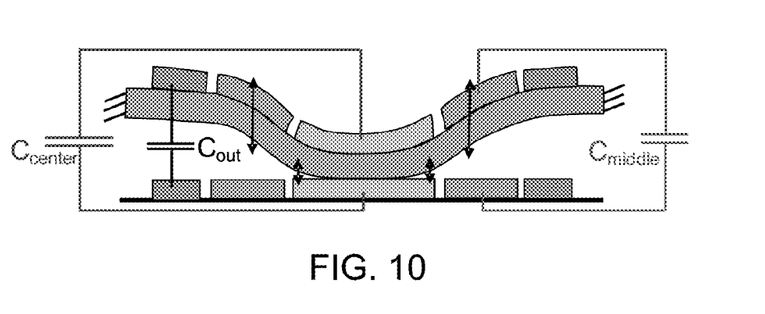
FIG. 10 shows another three electrode design of the invention.

By way of example, a segmented electrode design is shown in FIG. 10, with three electrode segments on both plates. After touch down, the capacitance change of the inner electrode becomes linear whereas the middle ring enters the high sensitivity zone. The two signals thus become separated and can be used independently. This separation of the signal characteristics enables the touch down event to be detected, based on differential capacitance measurement. The middle ring electrode can be used to obtain a very sensitive output and the center electrode yields an almost linear capacitance—pressure relationship.

Thus, different electrodes can be used for different modes of operation, and these modes can be selected based on detection of the touch down event.

An array of pressure sensors of different diameter might be combined to increase the total sensitivity range and the dynamic range as well. In pressure sensors, the touch point pressure will vary according to small changes in process conditions or dimensional control. With un-segmented electrodes the sensor is typically operated either in the "non touching" or the "touching" state because in these regimes the C-P behaviour varies in a relatively predictable way. The multi segmented approach allows operation around the touch point pressure yielding a) a linear response of the inner electrode when in touchdown and b) a highly sensitive response of the next electrode.

The design of FIG. 10 can thus be used to give a linear C-P response based on capacitance Ccenter, and a high pressure sensitivity response based on capacitance Cmiddle.

Differential capacitance measurement can also be used to find the zero deflection point, for example a differential capacitance of Gout with (Cmiddle+Ccenter) can be used to find the zero deflection point.

Another option enabled by the use of segmented electrodes is to actuate one of the electrodes with a bias voltage such that the center electrode is most close to its opposing electrode. This will enhance the sensitivity. Moreover, it can be used to calibrate the device. The membrane deflection is directly related to membrane size, thickness, and stress. Variations in process conditions could change from lot to lot and non-uniform membrane thickness could be deposited over each wafer leading to a certain spread in the deflection profile from die to die.

Figure 11:
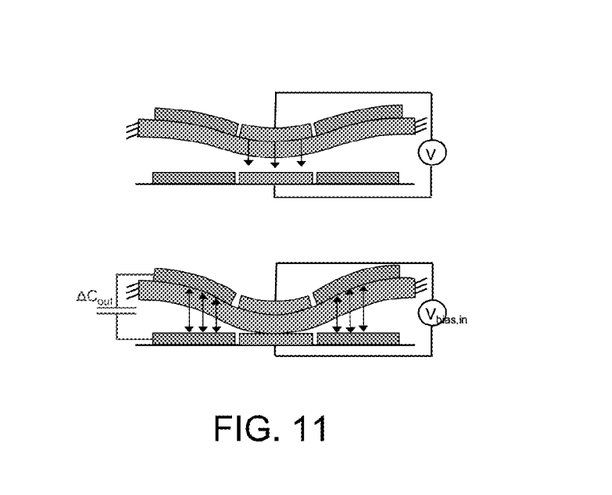
FIG. 11 shows a first way to use voltage bias in a sensor of the invention.
Figure 12:
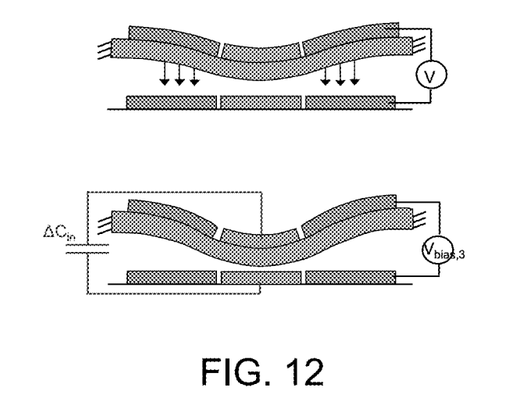
FIG. 12 shows a second way to use voltage bias in a sensor of the invention.

The bottom of FIG. 11 shows the application of a bias voltage to the central electrode (of a two-electrode design) to cause touchdown as part of a calibration stage, for then deriving a (different) bias voltage during operation as shown in the top of FIG. 11. The bias is applied to the central electrode and the capacitance measurement is based on the outer electrode. FIG. 12 shows the same approach with the bias applied to the outer electrode and sensing based on the inner electrode.

The invention also enables calibration to compensate for potential signal drift. Signal drift can be caused by aging, membrane stiffening, grain growth within the metal electrodes, stress relaxation, temperature effects, out gassing within the membrane etc. A well known method for signal drift compensation is a differential read-out in which the variable capacitor is compared to a capacitor of constant value. The disadvantage is that it consumes extra space and that not all root causes of signal drift can be compensated for.

A differential read-out can compensate for a drift in external parasitic capacitances, for example if the sensor is put into a liquid and can't be fully Faraday-shielded. This will not prevent a drift in the mechanical zero-crossing for example caused by creep of the (Al) electrodes. Also, if out-gassing occurs into the cavity the membrane will experience an opposing force and will deflect less than in its initial state. Using a differential read-out in combination with a segmented electrode allows to determine reference deflection points to enable calibration to take place, in a way which is not possible with a conventional differential read-out using a comb-comb capacitor as reference.

For calibration purposes the differential capacitance of the two segmented electrode areas can be determined at a certain reference pressure or actuation voltage to see if there is a shift.

Figure 13:
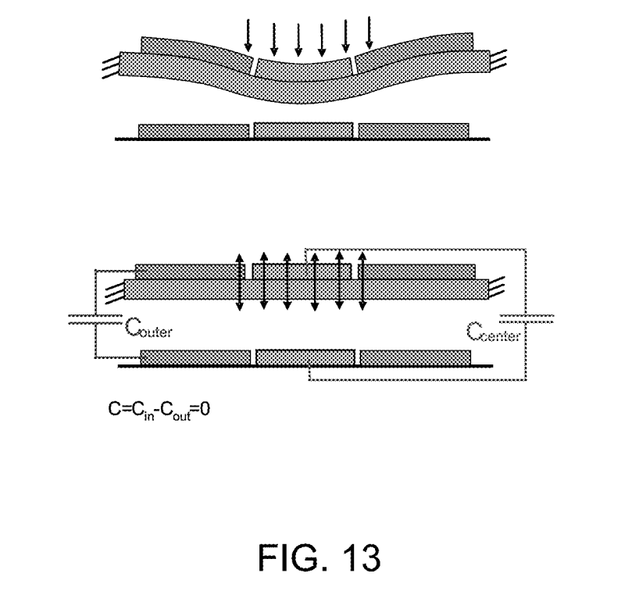
FIG. 13 is used to explain a calibration procedure.

This approach is shown in FIG. 13. The bottom part shows the application of a known reference pressure on one of the electrodes (the central electrode in this example) which is used to "zero" the sensor by finding the pressure for which the value of Couter=Ccenter.

A calibration process can involve applying several reference pressures to the membrane and measuring the capacitance. Correction parameters can be extracted from the measurements and stored in a memory on the chip or circuit elements can be trimmed. If this approach is combined with different membrane diameters, an even more accurate zero deflection state can be achieved. This latter approach only applies if the effective membrane properties are identical for different dimensions. In particular, identical thicknesses of the membranes need to be applied (and identical stress/Youngs' modulus) but this is in practice always the cause because there is very little variation in layer thickness or materials properties from die to die.

If there is some variation in the membrane thickness within wafer (WIW) or from wafer to wafer (WTW) the deflection profile and hence the capacitance will vary slightly for the same applied external pressure. By applying a voltage bias creating an electrostatic force, the deflection profiles of all pressure sensors can be set individually. Moreover, in performing a C-V sweep the mechanical compliance of the membrane can be determined giving information on the deflection profile if a uniform hydrostatic pressure is applied.

In this way an initial deflection profile (set point for a desired gap spacing) can be individually corrected for by applying a bias, but also the sensitivity (mechanical compliance of the membrane) can be tuned. Even a change in capacitance (i.e. deflection profile) due to thermal expansion of the membrane caused by temperature variations can be corrected for.

The individual values of the bias voltages should be stored in memory.

During manufacture, process variations have to be taken into account. During factory calibration, the individual sensor performance must be determined as accurately as possible with a minimum of calibration points in order to reduce costs. During sensor operation, signal drift must be detected first (if the sensor read-out changes it may be due to a real pressure variation or due to other factors) and secondly there should be a way to correct for this signal drift.

An improved auto-calibration approach is enabled by the invention, which again involves applying an electrostatic force by biasing one electrode at a voltage. Since the electrode area and the distance of the plates are well defined during processing, the electrostatic pressure is also well defined. For example, if the plate distance (i.e. gap between the membrane and the substrate) or the curvature of the membrane (influence of stress gradient) is not well-defined during production, then the electrostatic pressure can be calibrated during production in the same way as a standard calibration. The advantage is that the auto-calibration procedure via the electrostatic pressure can compensate for temperature shifts directly. If these parameters are well controlled, then the calibration procedure can be simplified with less reference pressures (or even only ambient pressure as reference pressure).

The resonance frequency of the membrane could also be measured and from that the mechanical compliance can be deduced. This is particularly suitable for use in gases or well known liquids. An oscillator can be built that locks to the resonance. The oscillating signal can at the same time be used to sense the capacitance of the sensor and hence the pressure.

The segmented electrodes also allow new read out schemes.

Upon using thin membranes with sufficiently large membranes (e.g. 1000-2000 nm thick, 100-200 µm diameter) actuation voltages of about 10-20 V are needed to pull the membrane into collapse. In order to force the membrane into a certain deflected condition (e.g. half way the into the gap) this will require a large voltage difference between the electrodes at low pressures whereas a small electrostatic force is required if the pressure is large (and the membrane already has attained the desired deflection state).

If using thick membranes that are relatively small (e.g. 2-3 µm thick, 50-75 µm diameter), much higher actuation voltages are needed pull the membrane into collapse (e.g. 50-100 V). These types of membranes have a high flexural rigidity and are typically used if the pressure difference between the cavity and the outside environment is large (e.g. >1 bar). These kinds of high voltages are not very practical from electrical breakdown and isolation point of view, as well as the requirement of voltage up-conversion using DC-DC converter due to low supply voltages, and the use of more expensive, high voltage, non standard CMOS technologies. However, the segmented electrode approach allows an improvement to the signal to noise ratio and allows an internal calibration based on a differential capacitance measurement.

Figure 14:
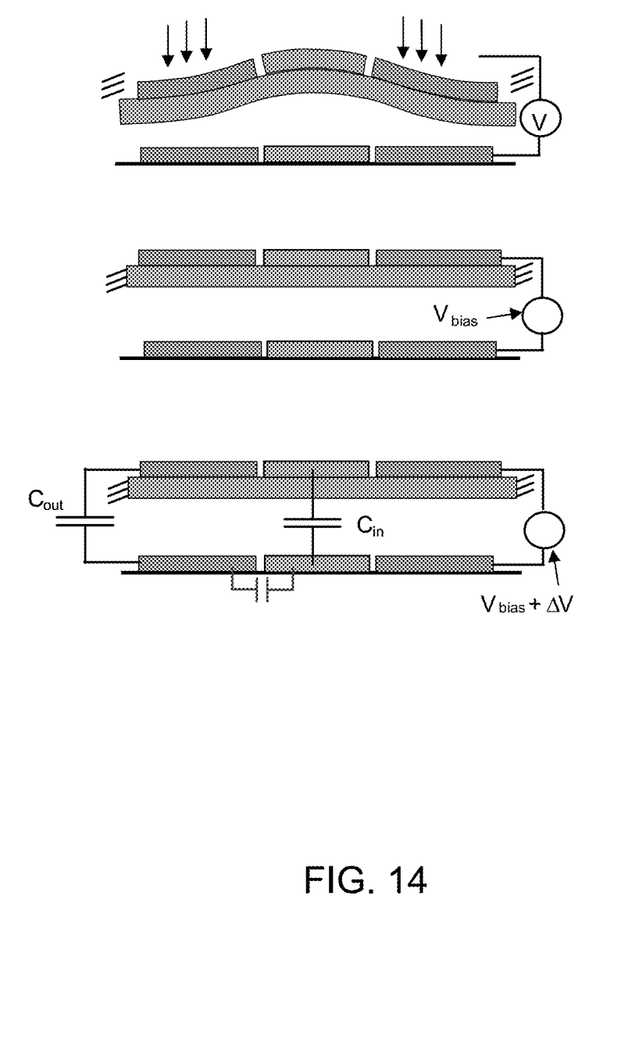
FIG. 14 shows a bias voltage calibration and read-out method of the invention.

If the external pressure is lower than the pressure in the cavity (e.g. respectively vacuum and 100 mbar internal pressure) the membrane will have a domed shape (for example as shown at the top of FIG. 14). A compensation circuit can be programmed in such a way that the outer electrode capacitance is the inner electrode capacitance+an additional value, X to make the ratio between the inner and the outer electrode a predefined value e.g. 1. This avoids the need for voltage actuation to make the membrane flat. The value X can be for example a switched capacitor bank, or else the approach can be implemented in software. The additional capacitance X is then a measure for the internal cavity pressure e.g. caused by out-gassing.

Another embodiment is to use an active feed-back loop and keep the ratio of the capacitance constant by applying an bias voltage. The advantage is a very linear output as the membrane deflection remains constant. On the other hand a high voltage generator and more circuitry is required, and could cause shorter lifetime due to continuous voltage stress.

An advantage of using the segmented electrode is the ability to detect small capacitance differences between the inner and outer electrode. As the outer electrode only contributes marginally to changes in capacitance this electrode is preferably used for actuation whereas the inner electrode should be used to measure very accurately the capacitance.

Although the capacitance change of the outer electrode is marginal upon actuation, the outer electrode can be used to pull in the membrane to make the inner electrode approach the bottom electrode. Thus, applying a bias to the outer electrode will increase the sensitivity to small pressure variations significantly. The DC voltage bias on the outer electrode creates an off-set to the capacitance measurement which is independent of the applied pressure and can be used to characterize/calibrate the sensor even further.

FIG. 14 shows this bias voltage calibration and read-out method.

The top part shows the application of an actuation voltage, to pull the membrane in from an initial domed shape to a flat shape. Note that applied pressure levels can be used to lift the membrane to a flat shape (since actuation voltages can only be used to pull the membrane in).

The middle part shows the application of a bias reference voltage, sufficient that the membrane will be forced to its un-deflected state. A reference pressure is applied during this calibration stage. This bias voltage can be determined based on the differential capacitance becoming close to zero between the inner and outer electrodes if they have equal surface area. As mentioned above, instead of achieving this by actuating one of the electrodes using an electrostatic force, it can be achieved during the calibration phase by varying the pressure difference between the cavity and the outside environment. If a reference pressure is available the device can be calibrated using this differential capacitance measurement method.

In use of the device, an applied pressure will result in a voltage change that is required to keep the differential capacitance zero. Thus, by using a feedback system to keep the membrane flat, the required actuation voltage (above the bias voltage determined in calibration) can be used to give the pressure measurement.

The state of deflection can be characterized by three methods:

a capacitance measurement as function of pressure (for example as explained with reference to FIGS. 5 to 13)

b) a DC voltage bias on one of the electrodes creating an off-set to the capacitance measurement as function of pressure (as explained with reference to FIG. 14)

c) determination of resonance frequency and quality factor of an electrostatic excited membrane. The resonance frequency can be determined by measuring the electrical impedance between both actuation electrodes as a function of frequency while applying a DC bias voltage, Vdc, across the membrane. The membrane is thus excited by the electrostatic force and its motion is detected by measuring the capacitive current, which is a result of the fact that the capacitance between the opposite electrodes is a function of the distance $z0+\Delta z$. Alternatively the device can be configured in a feed-back loop with an amplifier to create a MEMS oscillator, which continuously generates an AC output signal with a frequency which depends on the external pressure. The frequency of the output signal is a measure for the pressure.

The frequency can then be determined using any conventional way of measuring resonance frequencies of MEMS, mechanical resonators, or RLC circuits.

This method of measuring resonance frequency is known in the field of MEMS resonators, but it is quite difficult to determine the quality factor and the resonance peak frequency at elevated pressures due to peak broadening.

The invention enables an independent capacitance measurement of one electrode as function of time while actuating the other electrode. This yields a more sensitive determination of the resonance frequency and its amplitude because the central part of the membrane is more sensitive to variations in capacitance due to larger deflection amplitudes than the outer part.

The pressure sensor can be fabricated using standard technologies.

Figure 15:
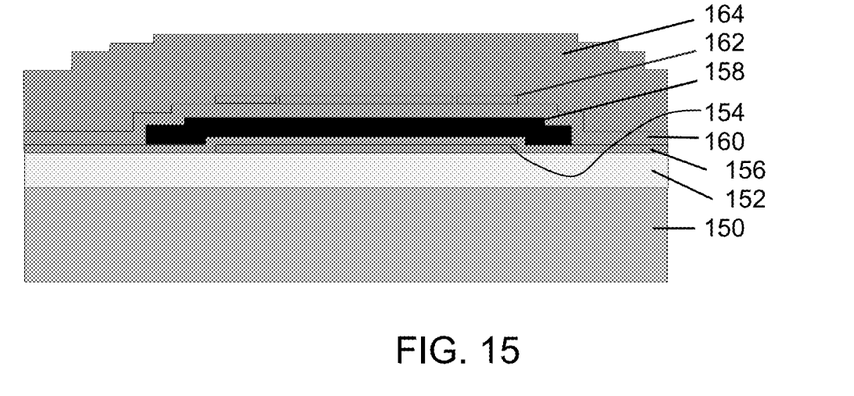
FIG. 15 shows the device after some of the initial fabrication stages.

FIG. 15 shows the device after some of the initial fabrication stages.

The device is formed on a substrate 150 which can be a plain isolating layer 152 of silicon oxide or silicon nitride on a bare silicon wafer 150 as shown, or an isolating layer on top of a CMOS wafer with integrated electronic circuitry underneath. A bottom metal electrode 154 is deposited (typically 200 nm thick PVD Al) and subsequently patterned.

An isolating silicon nitride or silicon oxide film 156 (for example 100 nm of silicon nitride) is deposited on top of the metal electrode by means of PECVD or LPCVD. This is followed by the deposition of a sacrificial layer 158 which will be removed later on to form a cavity: The sacrificial layer consists of a 300-500 nm thick metallic layer (typically Mo, Al or Cr). This layer is patterned in an appropriate circular shape with flaps in order to access this layer outside the circular membrane area for the sacrificial etch.

A larger sacrificial film thickness creates a larger gap and results in an overall a smaller sensitivity but a larger dynamic pressure range. A small sacrificial film thickness could result in more processing difficulties upon removal of the sacrificial layer but is advantageous to increase the capacitance between the parallel plate electrodes as high as possible.

The sacrificial layer deposition is followed by the deposition of a PECVD silicon nitride or silicon oxide capping layer 160 which functions as a passivation layer.

This particular film is typically 200-300 nm thick and serves as etch protection for the top electrode during the sacrificial layer etch. It should be as thin as possible and have preferably a dielectric constant larger than 4 to increase the capacitive coupling. A thin top metal electrode 162 (Al) is deposited on top. The top electrode 162 should be as thin as possible (i.e. 100-200 nm) to decrease the thermal expansion coefficient of the membrane. The passivation layer 160 avoids electrical contact between the two metal layers.

The top electrode is patterned into multiple segments according to the present invention to optimize sensitivity, S/N ratio and allow differential capacitance measurements. The top electrode is then etched.

The electrode is then capped with a thick PECVD silicon nitride or oxide layer 164. The thickness and stress of this layer influences the final rigidity of the membrane. The stress in the SiNx:H layer can be tuned with the deposition conditions. Preferably the membrane diameter is optimized in order to define a certain pressure operating range for a given SiN membrane thickness. Typically the membrane thickness is chosen to be between 1.5 um and 2.5 um for membrane diameters between 50-75 um which yield a sufficient broad dynamic pressure range between 0.5 and 5 bar. For low pressures (i.e <0.2 bar) the thickness of the membrane must be decreased to 300-500 nm in order to create a much more flexible membrane.

In order to reduce the stress gradient the SiN thicknesses below and above the metal electrodes is adjusted so that the top electrode 162 is positioned in the middle of the membrane.

Figure 16:
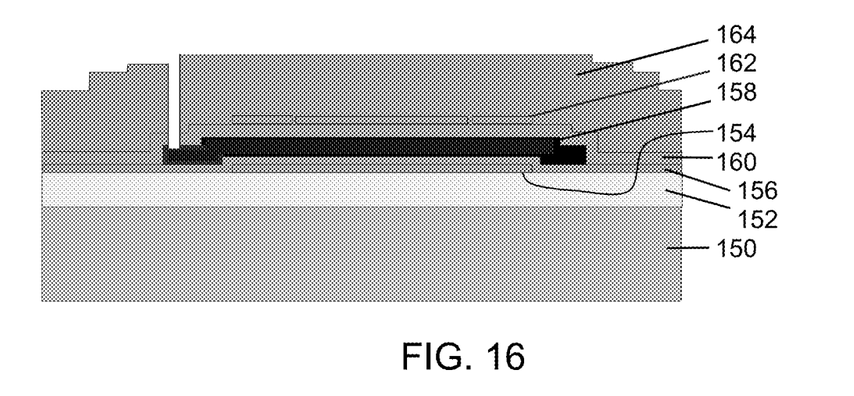
FIG. 16 shows the device after further fabrication stages.

The process flow is continued with the patterning and dry etching of holes stopping on the sacrificial layer 158 as shown in FIG. 16. These holes are placed circumferentially around the membrane i.e. outside the circular electrode area and are typically 1-2 um in diameter. The larger the hole diameter the easier the sacrificial material can be removed. The cavity is formed during sacrificial layer etch. The sacrificial 158 layer can be selectively removed with a PES etch (mixture of Phosphoric acid, Sulphuric acid, and Acetic acid).

After an anneal at 400° C.-450° C. to remove water and to remove excess of hydrogen form the SiNx:H membrane "Hot" PVD Al is deposited at 350° C. chuck temperature. Upon using "Al-reflow" during the non-conformal Al deposition the etch holes will effectively seal the hole without a "seam" at PVD base pressure.

Figure 17:
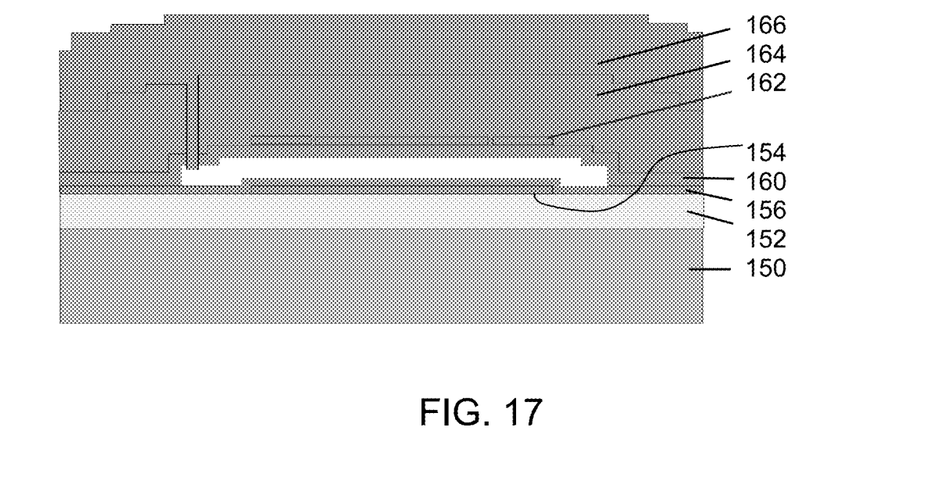
FIG. 17 shows the device after further fabrication stages.

FIG. 17 shows the aluminium etch hole sealing/plugging layer 166.

The required thickness of the etch hole sealing layer 166 for effective closure depends on the diameter of the hole and the gap diameter. For a large gap heights (e.g. >1 um) in combination with large etch holes (e.g. 2 um diameter) a rather thick Al layer (5 um) is required for closure. Typical dimensions for the etch hole diameter is 1 um and 2 um for the Al plug layer thickness.

Figure 18:
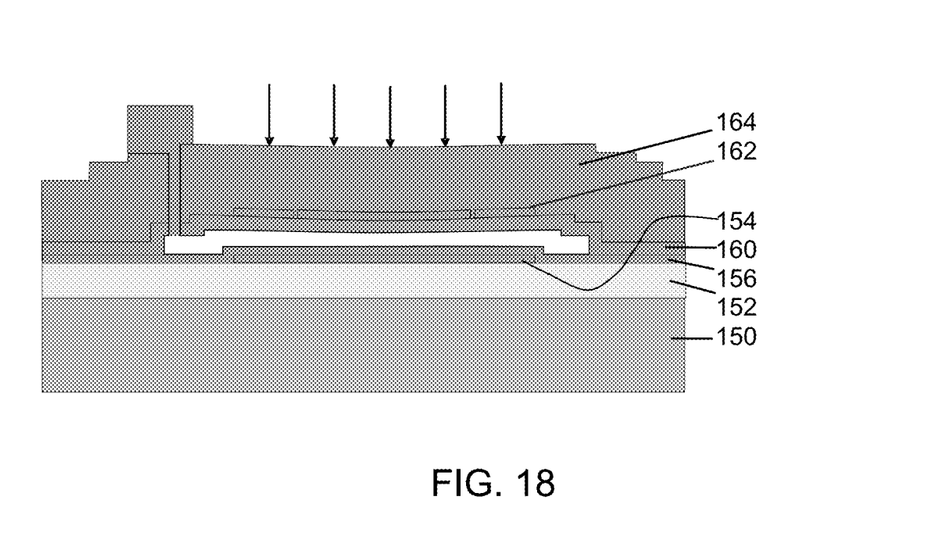
FIG. 18 shows the device after the final fabrication stages.

Al is then removed from the membrane by wet or dry etching using a mask (or without mask but then a timed etch is required). Depending on the membrane rigidity/thickness the membrane will be deflected due to vacuum inside cavity when the membrane is exposed to ambient pressure after the Al removal. The resulting structure is shown in FIG. 18, in which a plug 168 remains, Finally, electrical connections need to be fabricated to contact the segmented top and bottom electrodes. Electrical connections and bond pads are created by subsequent patterning, etching and deposition of Al using standard manufacturing methods.

For maximum displacement, the most robust shape against a large stress gradient is a circular membrane plate, but hexagonal, square or rectangular shapes are also possible.

The device can be packaged in a way which keeps the membrane sensor area free in order to allow deflection of the membrane and detect the pressure changes. For this purpose, a non sticking foil can be applied over the die and a plunger larger than the size of the membrane is pushed against the die when the molding compound is injected at high pressure in the packaging mould.

When the plunger and the mould are released, the foil is removed from membrane. The plunger protects the membrane against the high pressure and the deposition of moulding compound onto the membrane.

The segmented electrode design of the invention enables a smaller device, allowing self-calibration with improved signal-to-noise ratio and tunable sensitivity. It also allows the use of a differential capacitance measurement to find a predefined deflection state. If this predefined deflection state is well known the actual device performance can be modelled more accurately. This then enables an absolute measurement of membrane deflection. Moreover, it allows for calibration to correct for signal drift, can perform capacitance measurement in either high sensitive and linear regime and increases the total dynamic range significantly.

The use of a smaller central electrode is beneficial for an improved signal to noise ratio to detect small pressure variations, and a DC bias can be used to tune the sensitivity to a desired range.

The method of sealing the cavity in the process above can operate at low pressure. The use of a Physical Vapour Deposited (PVD) metallic plug is beneficial to reduce base pressure and avoids undesired pressure variations in the cavity due to thermal expansion of the gas. Using LPCVD or PECVD for the cavity sealing step results in a relative large and uncontrolled base pressure inside the cavity. By placing the etch holes outside the membrane area, this requires a much better selectivity of the sacrificial layer etch. Upon using a metallic sacrificial layer (Mo, Al, or Cr) a much better selectivity can be obtained against silicon oxide and/or silicon nitride capping layers.

The invention uses a capacitive read-out system for the pressure sensor. This has clear advantages compared to piezo resistive read-out systems. Compared to a capacitive read-out a piezo resistive read-out consumes more power and is more temperature sensitive for a given size and signal to noise ratio. Moreover, the latter is relatively large, lacks integration flexibility and can not be constructed on top of CMOS.

Many other advantages of the sensor of the invention are outlined above. Some of these are summarised below.

The membrane can be forced into the zero deflection state at a certain pressure using a voltage applied to one of the segmented electrodes. Instead of measuring the capacitance change due to membrane deflection, the membrane deflection can be kept in a certain deflected state upon applying a bias voltage to the outer or inner electrode: The bias voltage is then a measure for the pressure difference between cavity and outer world. This approach is insensitive to variations in stress in the movable electrode arrangement (the membrane).

Improved sensitivity is made possible due to the use of a small inner electrode having a larger deflection amplitude than the outer electrode. This improves the signal to noise ratio.

The ability to provide a bias voltage can also be used for other purposes. For example, deflection due to thermal expansion of the cavity can be compensated for, by applying a voltage bias to the outer electrode and using a temperature sensor to obtain the temperature, which is then used to derive the required compensating voltage bias.

A large dynamic pressure measurement range is enabled that can be calibrated using different voltage set points. The use of multiple sensor electrodes also enables the touch point pressure to be accurately determined using a differential capacitance measurement. This then enables the sensor to be switched to a different measuring range. The two measuring ranges comprise a linear variation of capacitance with pressure and a highly sensitive, but non-linear change in capacitance with pressure. The sensor can also be deliberately pulled into collapse to create a linear pressure-capacitance read-out.

The membrane can also be brought into resonance by applying an electrostatic field to the outer electrode for example. The problem of using the method of resonance frequency peak broadening is that at large pressures i.e. >0.1 bar the Q factor becomes low which makes pressure measurements inaccurate at ambient pressures. Instead of determining the Q-factor of the peak resonance, the resulting oscillations in capacitance can now be accurately determined via the inner electrode. This will expand the measuring range for the resonance based method.

The main examples above use two electrodes, but there may be three (as also shown above) or more electrodes in the segmented electrode arrangement. In the description and claims, reference to an inner electrode and an outer electrode thus should be understood as referring to both electrodes in a two-electrode design, or referring to any pair of electrodes in a design with three or more concentric electrodes.

The invention is of particular interest for use in consumer applications like mobile phones (built next to the microphone), weather stations, GPS assist, watches, etc. It can be used in automotive applications like tyre pressure monitoring systems, in smart building applications (HVAC, air flow measurements, pressure drop over air filters), and in medical applications.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A MEMS pressure sensor comprising:
   a plurality of opposing electrode arrangements, wherein one of the electrode arrangements is suspended over the other such that it is movable in response to an applied pressure, and wherein another of the electrode arrangements is suspended over the other such that is movable in response to an applied bias voltage and the applied pressure;
   an element for deriving an output from a capacitance between at least one of the electrode arrangements, wherein at least one of the electrode arrangements comprises an inner electrode and an outer electrode arranged around the inner electrode; and
   an element for applying a voltage bias to one of the inner electrode and the outer electrode, wherein the other electrode of the same electrode arrangement is used for capacitance measurement.

2. A sensor as claimed in claim 1, wherein the inner electrode is circular and the outer electrode is annular, and the inner electrode and the outer electrode have the same area.

3. A sensor as claimed in claim 1, further comprising:
   an element for applying a voltage bias to one of the inner electrode and the outer electrode, and
   a feedback system for maintaining a fixed ratio between the capacitance associated with the inner electrode and the outer electrode such as to maintain the suspended electrode arrangement in a predefined deflection configuration.

4. A sensor as claimed in claim 1, wherein the element for deriving an output is configured to enable the output to be derived from at least one of:
   the capacitance associated with the inner electrode alone;
   the capacitance associated with the outer electrode alone; and
   the combined capacitances associated with the inner and outer electrodes.

5. An article of manufacture comprising a MEMS pressure sensor according to claim 1, wherein the pressure sensor comprises a plurality of opposing electrode arrangements, wherein one of the electrode arrangements is suspended over the other such that it is movable in response to an applied pressure, wherein at least one of the electrode arrangements comprises an inner electrode and an outer electrode arranged around the inner electrode, and further comprising a non-transitory, tangible machine readable storage medium containing executable machine instructions said instructions including:
   measuring independently a capacitance associated with the inner electrode and the outer electrode to derive an output signal representing the pressure.

6. The article as claimed in claim 5, further comprising:
   applying a voltage bias to one of the inner electrode and the outer electrode, and using the other electrode for capacitance measurement; or
   applying a voltage bias to at least one of the inner electrode and the outer electrode, and measuring simultaneously the capacitance change and using this information for determining a state of membrane deflection and/or mechanical compliance of a membrane and storing the measurement data in a memory for calibration purposes; or
   applying a voltage bias to at least one of the inner electrode and the outer electrode, and determining a resonance frequency and a quality factor of an electrostatic excited membrane and using this information for determining the state of membrane deflection and/or mechanical compliance of the membrane and storing the measurement data in a memory for calibration purposes; or applying a voltage bias to at least one of the inner electrode and the outer electrode, to tune a pressure sensitivity to a desired range.

7. The article as claimed in claim 5, the instructions further comprising applying a voltage bias to one of the inner electrode and the outer electrode, and adjusting the voltage bias to maintain a fixed ratio between the capacitance associated with the inner electrode and the outer electrode such as to maintain the suspended electrode arrangement in a predefined configuration, wherein the output signal is derived from an adjustment level of the voltage bias.

8. The article as claimed in claim 5, the instructions further comprising deriving a differential capacitance between the capacitances associated with the inner electrode and the outer electrode and using the differential capacitance to determine when the movable electrode arrangement has reached its limit of movement.

9. The article as claimed in claim 8, the instructions further comprising selecting which electrode to use for deriving the output based on whether the limit of movement has been reached.

10. The article as claimed in claim 5, the instructions further comprising deriving an output from one of:
    the capacitance associated with the inner electrode alone;
    the capacitance associated with the outer electrode alone;
    the combined capacitances associated with the inner and outer electrodes, wherein the selection is based on at least one of a desired sensitivity, signal to noise ratio and dynamic range.

11. A method of fabricating a MEMS pressure sensor according to claim 1, comprising:
    forming opposing electrode arrangements over a substrate, wherein one of the electrode arrangements is fixed to the substrate and the other is suspended over the top such that it is movable in response to an applied pressure,
    wherein the forming of at least one of the electrode arrangements comprises forming an inner electrode and an outer electrode arranged around the inner electrode, and forming separate read out terminals for the inner and outer electrodes.

12. A method as claimed in claim 11, further comprising:
    forming a lower metal layer over a substrate arrangement and defining the one electrode arrangement;
    forming a sacrificial layer over the lower metal layer to define a cavity;
    forming a passivation layer over the sacrificial layer;
    forming a top metal layer and defining the other electrode arrangement, wherein the passivation layer (160) avoids electrical contact between the lower metal layer and the top metal layer;
    forming a capping layer over the top metal layer;
    forming an etch opening in the capping layer leading to the sacrificial layer;
    removing the sacrificial layer through the etch opening;
    forming a plugging layer for plugging the etch opening; and
    removing the plugging layer other than over the etch opening.

13. A method as claimed in claim 12, wherein the etch opening is formed laterally to a side of the electrode arrangements.

14. A method as claimed in claim 12, wherein the plugging layer is a metal formed by PVD.

15. A MEMS pressure sensor comprising:
    first and second separated electrode segments on a flexible membrane, wherein the first and second separated electrode segments are configured to move in response to an applied pressure;
    third and fourth separated electrode segments, wherein the first and third separated electrode elements form a first capacitor and the second and fourth separated electrode elements form a second capacitor; and
    readout electronics for determining the capacitance value of the first and second capacitors, wherein the readout electronics applies a voltage bias to the first electrode segment, and the second electrode segment is used for capacitance measurement.

16. A sensor as claimed in claim 15, wherein the first and second electrode segments comprise an inner electrode and an outer electrode arranged around the inner electrode.

17. A sensor as claimed in claim 16, wherein the inner electrode is circular and the outer electrode is annular, and the inner electrode and the outer electrode have the same area.

18. A sensor as claimed in claim 15, further comprising:
    a feedback system for maintaining a fixed ratio between the capacitance associated with the first and second capacitors such as to maintain the electrode suspension in a predefined deflection configuration.

19. A sensor as claimed in claim 15, wherein the readout electronics are configured to produce an output that is derived from at least one of:
    the capacitance of the first capacitor;
    the capacitance of the second capacitor; and
    the combined capacitances of the first and second capacitors.

* * * * *